(12) United States Patent
Salowitz

(10) Patent No.: US 10,408,624 B2
(45) Date of Patent: Sep. 10, 2019

(54) PROVIDING FAMILIARIZING DIRECTIONAL INFORMATION

(71) Applicant: Microsoft Technology Licensing, LLC, Redmond, WA (US)

(72) Inventor: Elizabeth Salowitz, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/490,850

(22) Filed: Apr. 18, 2017

(65) Prior Publication Data

US 2018/0299272 A1 Oct. 18, 2018

(51) Int. Cl.
| | |
|---|---|
| *G01C 21/20* | (2006.01) |
| *G06T 11/60* | (2006.01) |
| *G06F 3/01* | (2006.01) |
| *G02B 27/01* | (2006.01) |
| *G06F 1/16* | (2006.01) |
| *G06T 11/00* | (2006.01) |
| *G01C 21/36* | (2006.01) |
| *H04W 4/021* | (2018.01) |
| *H04W 4/029* | (2018.01) |

(52) U.S. Cl.
CPC ......... *G01C 21/20* (2013.01); *G01C 21/3682* (2013.01); *G02B 27/0172* (2013.01); *G06F 1/163* (2013.01); *G06F 3/011* (2013.01); *G06T 11/00* (2013.01); *G06T 11/60* (2013.01); *H04W 4/021* (2013.01); *H04W 4/029* (2018.02); *G02B 2027/0141* (2013.01)

(58) Field of Classification Search
CPC .................................................... G01C 21/20
USPC ........................................................ 345/633
See application file for complete search history.

(56) References Cited

U.S. PATENT DOCUMENTS

| | | | |
|---|---|---|---|
| 8,493,408 B2* | 7/2013 | Williamson | G01C 21/3647 345/629 |
| 8,666,792 B1* | 3/2014 | Sedota, Jr. | G06Q 50/16 705/7.11 |
| 9,396,331 B2* | 7/2016 | Eisen | G06F 21/32 |
| 9,628,958 B1* | 4/2017 | McBurney | H04W 4/027 |
| 9,749,780 B2* | 8/2017 | Huang | G01S 5/0252 |

(Continued)

OTHER PUBLICATIONS

"Knapp AG—KiSoft Vision", https://www.youtube.com/watch?v=BWY8uFltelM, Retrieved on: Oct. 25, 2016, 1 pages.

(Continued)

*Primary Examiner* — Javid A Amini
(74) *Attorney, Agent, or Firm* — Alleman Hall Creasman & Tuttle LLP

(57) ABSTRACT

Examples are disclosed that relate to providing information regarding nearby locations that may be familiar to a user to help inform the user of a current location within an area. One disclosed example provides a computing device comprising a display, a logic subsystem, and a storage subsystem comprising instructions executable by the logic subsystem to form a list of familiar locations for a user based upon a user history regarding the familiar locations, determine that the user is within a threshold proximity to a nearby familiar location on the list of familiar locations, and in response, output directional information indicating a relative position of the nearby familiar location on the list of familiar locations.

19 Claims, 6 Drawing Sheets

(56) References Cited

U.S. PATENT DOCUMENTS

| | | | | |
|---|---|---|---|---|
| 2003/0210228 | A1* | 11/2003 | Ebersole | G02B 27/017 345/157 |
| 2007/0168888 | A1* | 7/2007 | Jawerth | G01C 21/3664 715/857 |
| 2007/0219711 | A1* | 9/2007 | Kaldewey | G01C 21/00 701/434 |
| 2007/0271030 | A1* | 11/2007 | Deurwaarder | G06Q 20/102 701/533 |
| 2009/0244097 | A1 | 10/2009 | Estevez | |
| 2010/0017118 | A1* | 1/2010 | Dougherty | G01C 21/3423 701/533 |
| 2011/0199479 | A1* | 8/2011 | Waldman | G01C 21/3602 348/116 |
| 2011/0213664 | A1* | 9/2011 | Osterhout | G02B 27/017 705/14.58 |
| 2012/0105474 | A1* | 5/2012 | Cudalbu | G01C 21/20 345/633 |
| 2012/0120103 | A1* | 5/2012 | Border | G02B 27/017 345/633 |
| 2012/0208551 | A1* | 8/2012 | Hill | H04M 1/7253 455/456.1 |
| 2012/0311465 | A1* | 12/2012 | Nealer | H04L 29/06 715/760 |
| 2013/0128060 | A1* | 5/2013 | Rhoads | G01C 21/20 348/207.1 |
| 2013/0293584 | A1* | 11/2013 | Anderson | G06T 11/00 345/633 |
| 2013/0317944 | A1* | 11/2013 | Huang | G01S 5/0252 705/26.61 |
| 2014/0222558 | A1 | 8/2014 | Spivack | |
| 2014/0250120 | A1* | 9/2014 | Mei | G06F 3/0488 707/736 |
| 2015/0097867 | A1 | 4/2015 | McArdle et al. | |
| 2015/0193982 | A1 | 7/2015 | Mihelich et al. | |
| 2015/0279187 | A1* | 10/2015 | Kranz | G08B 21/0415 340/539.12 |
| 2015/0302655 | A1 | 10/2015 | Miller et al. | |
| 2016/0015473 | A1* | 1/2016 | Frimer | A61B 90/50 606/130 |
| 2016/0066157 | A1* | 3/2016 | Noorshams | G01C 21/206 455/457 |
| 2016/0117861 | A1 | 4/2016 | Liu et al. | |
| 2017/0034650 | A1* | 2/2017 | Shah | H04W 4/02 |
| 2018/0103348 | A1* | 4/2018 | Malone | G01S 1/02 |
| 2018/0156623 | A1* | 6/2018 | West | G01C 21/3423 |

OTHER PUBLICATIONS

Specht, et al., "Mobile Augmented Reality for Learning", In Journal of the Research Center for Educational Technology, vol. 7, No. 1, Retrieved on: Oct. 25, 2016, 11 pages.

Kalkofen, et al., "Interactive Focus and Context Visualization for Augmented Reality", In Proceedings of the 6th IEEE and ACM International Symposium on Mixed and Augmented, Published on: Nov. 13, 2007, 10 pages.

Say, Mark, "Augmented reality: good for business?", http://www.director.co.uk/augmented-reality-good-for-business-expert-technology-1-feb-2014/, Published on: Feb. 1, 2014, 19 pages.

Golson, Jordan, "Holograms Could Bring Videogame-Like Navigation to Your Car", https://www.wired.com/2015/04/holograms-bring-videogame-like-navigation-car/, Published on: Apr. 28, 2015, 2 pages.

"Wikitude", https://play.google.com/store/apps/details?id=com.wikitude&hl=en, Retrieved on: Oct. 25, 2016, 3 pages.

Avery, et al., "Visualizing Occluded Physical Objects in Unfamiliar Outdoor Augmented Reality Environments", In Proceedings of the 6th IEEE and ACM International Symposium on Mixed and Augmented Reality, Nov. 13, 2007, 2 pages.

* cited by examiner

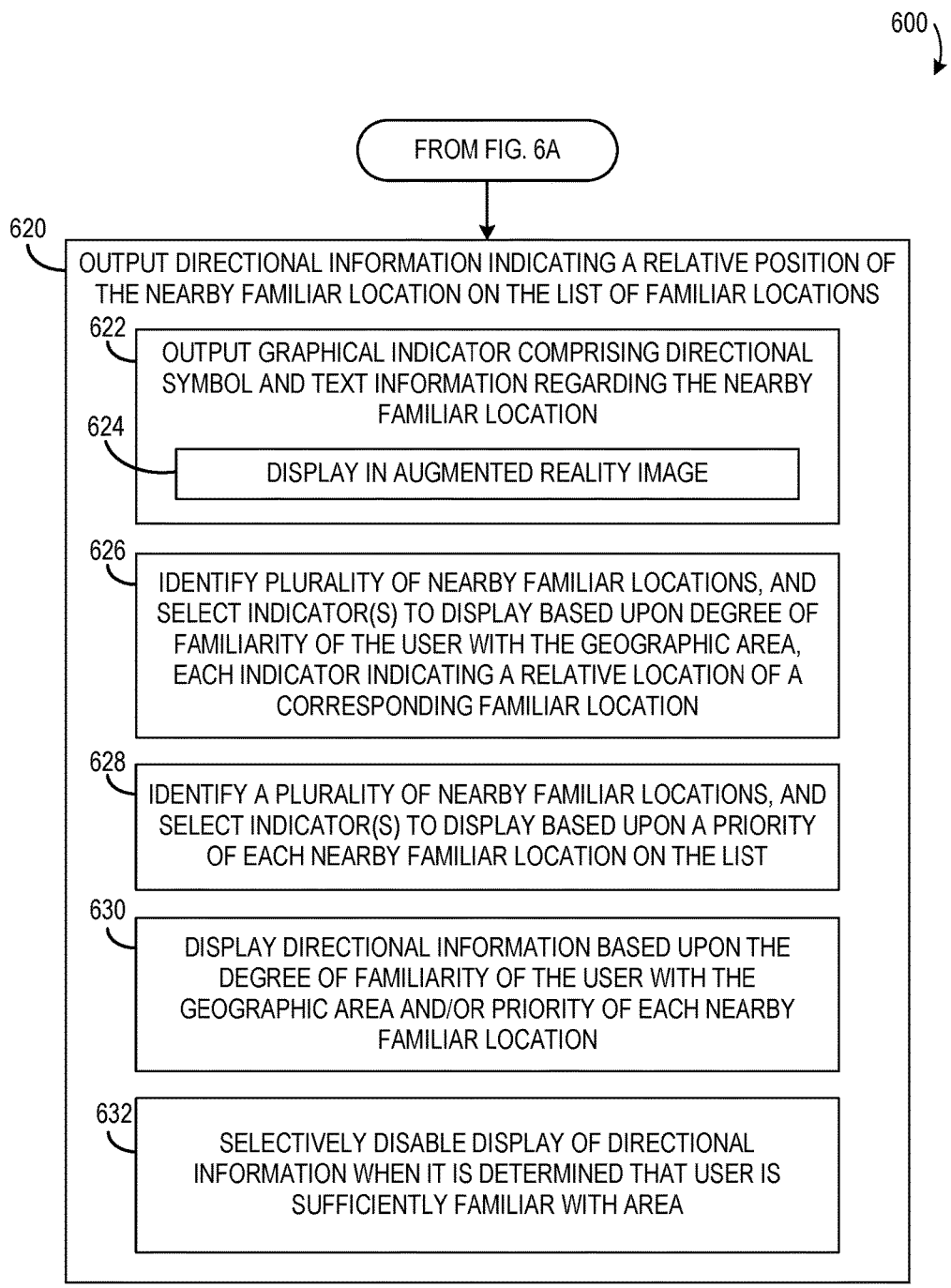

US 10,408,624 B2

PROVIDING FAMILIARIZING DIRECTIONAL INFORMATION

BACKGROUND

Computing devices may provide navigation information, such as current location and route information, via a combination of map data and location data. Some map applications also may allow viewing of and interaction with previously-recorded street-level images.

SUMMARY

Examples are disclosed that relate to providing information regarding nearby locations that may be familiar to a user to help inform the user of a current location within an area. One disclosed example provides a computing device comprising a display, a logic subsystem, and a storage subsystem comprising instructions executable by the logic subsystem to form a list of familiar locations for a user based upon a user history regarding the familiar locations, determine that the user is within a threshold proximity to a nearby familiar location on the list of familiar locations, and in response, output directional information indicating a relative position of the nearby familiar location on the list of familiar locations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 6A and 6B are flow diagrams illustrating an example method of outputting directional information relating to nearby familiar locations.

DETAILED DESCRIPTION

In unfamiliar settings, it may be helpful for a person to understand relative locations of nearby familiar places. For example, a person may have previously visited a specific location in a city, such as the library, but may not otherwise know the city particularly well. By providing via a mobile computing device user-specific directional information related to such familiar locations, such as where the library is located relative to a current location of the user, the user may more easily understand their current location within the city.

Accordingly, examples are disclosed that relate to providing information regarding nearby locations that may be familiar to a user to help inform the user of a current location within an area. As described in more detail below, a computing system may be configured to form a list of familiar locations for a user based upon a user history regarding the determined familiar locations. Then, the computing system may compare current location data to the list of familiar locations, determine that the user is in proximity to a nearby familiar location on the list of familiar locations based upon comparing the current location data to the list of familiar locations, and output directional information indicating a relative position of the nearby familiar location on the list of familiar locations. This may help the user to have a better sense of location and orientation within an unfamiliar area.

Figure 1:
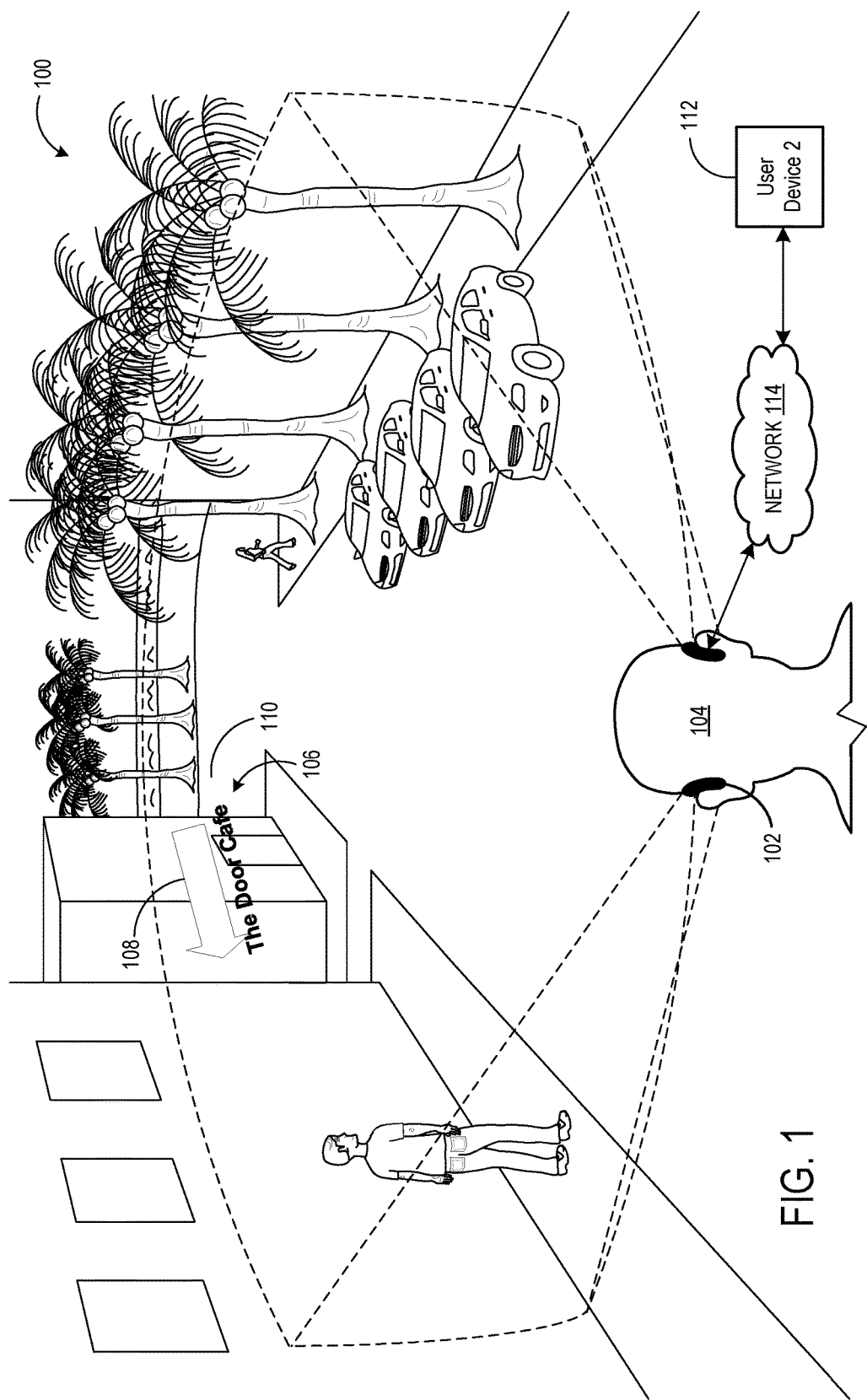
FIG. 1 shows an example use scenario in which a computing device outputs directional information related to a familiar location.

FIG. 1 shows an example use scenario 100 for a computing device in the form of a head-mounted display device 102 configured to output to a user directional information related to determined familiar locations of the user 104. As shown, the head-mounted display device 102 is displaying an augmented reality image over a real-world background. The augmented reality image may be displayed optically (e.g. via a see-through display system), or composited with video images acquired by a camera of the display device 102 and then displayed to the user 104. The augmented reality image comprises a graphical indicator 106 that includes a directional symbol 108 and text information 110 indicating a direction of a determined familiar location named "The Door Cafe."

The location "The Door Cafe" has been previously determined to be a familiar to the user 104 and included on a list of familiar places for the user. Locations may be determined to be familiar in any suitable manner. For example, the head-mounted display device 102 may be configured to assemble a list of locations determined to be familiar to the user 104 based upon a user history regarding the locations. As one example, such a user history may include information regarding past visits made by the user to the location, for example, as determined from Global Positioning Satellite (GPS) data. Such GPS data may be collected from a GPS sensor located on the head-mounted display device 104, and/or be obtained via a network 114 from one or more separate devices, such as another wearable computing device, a smartphone, and/or a vehicle of the user, as represented by "User Device 2" 112. GPS data that may indicate a user is likely familiar with a location may comprise, for example GPS data that indicates that a user spent a threshold amount of time at the location. GPS data from different devices may be stored in an account for the user, thereby allowing the various devices of the user 104 to share the data.

A user history with regard to a location also may include search history data for the user, such as web search terms and/or results. Search history information may include search terms and/or results related to locations of interest to a user, such as places that a user wishes to visit or has visited, and thus which may be familiar to the user. As a more detailed example, a user's search history data may indicate that a user searched for a specific location on a map, and/or viewed the specific location on the map via street-level imagery.

As a further example, the user history with regard to a location further may include mapping and/or navigation application data. Such data may include information on directions to locations previously requested by the user, and other information relevant to determining possible familiar locations. As a further example, the user history may include social media application data. Such data may indicate, for example, that the user has "checked in" to places, reviewed places, marked places as "favorite", etc. The user history further may include user calendar data, email data, texting data, and/or any other suitable data comprising information that may indicate locations that a user may have visited previously or that may otherwise be familiar to the user. In some examples, information regarding previously visited locations may also be entered directly via user input. As described in more detail below, the resulting list of determined familiar locations may be prioritized based on a determined degree of familiarity for each location, and updated over time to remove locations as they become less familiar or relevant while adding new locations of potentially greater relevance.

Continuing with FIG. 1, as "The Door Cafe" may be familiar to the user based upon the user's history regarding the location (for example, the user has been determined to have visited the location recently or frequently), the graphical indicator 106 displayed in the user history may give the user a reference for orientation and location when exploring the current area. Although the example of FIG. 1 is shown in the context of an augmented reality head-mounted display device, it will be understood that any other suitable display device may be utilized to output directional information, including but not limited to other wearable display devices, smartphones, in-vehicle head-up displays, as well as laptop computers and desktop computers when used to explore an area via a first-person street-level view.

Figure 2:
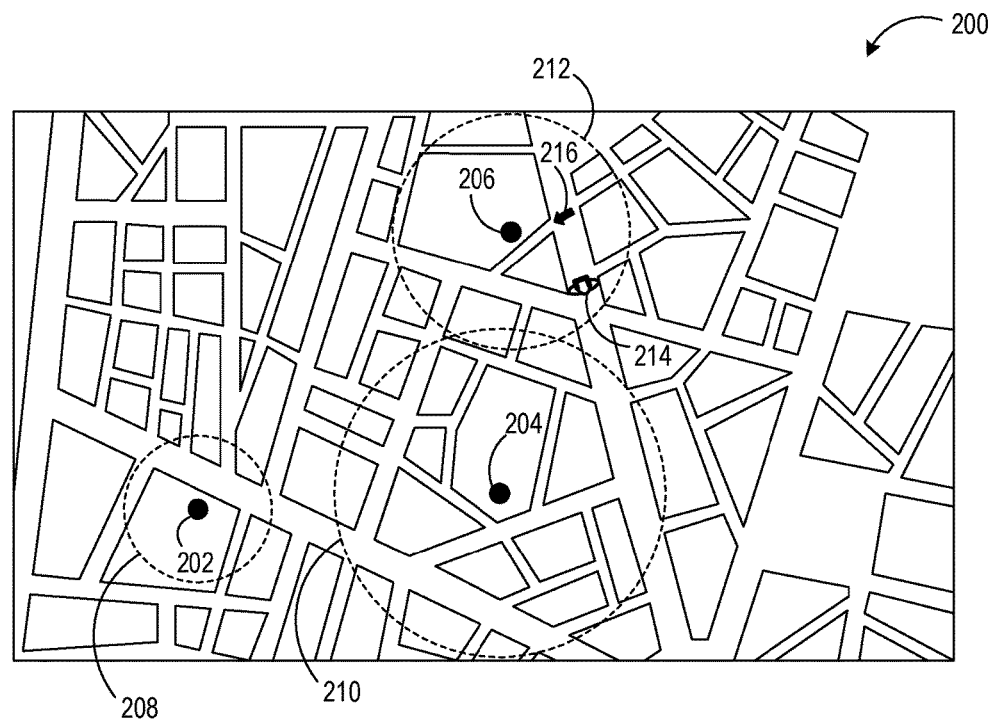
FIG. 2 shows an example map showing representations of geofences surrounding determined familiar locations.

The head-mounted display device 104 may be configured to display of the graphical indicator 106 based upon any suitable triggering event or events. In some implementations, a user-centric model may be utilized, in which the graphical indicator 106 is displayed in response to the head-mounted display device 104 being within a predetermined distance from a location of "The Door Cafe." As one example, upon determining a location to be familiar, a geofence is defined around the familiar location, wherein the term geofence refers to a virtual boundary defining a geographic area surrounding the familiar location. FIG. 2 shows an example map 200 that schematically illustrates familiar locations 202, 204, and 206 and respective geofences 208, 210, 212 for each familiar location. The geofences act as triggering features, such that when an augmented reality display device crosses and enters an interior of a geofence as determined, for example by comparing GPS data to the geofence locations, the device is triggered to display directional information indicating a relative position of the familiar location associated with the geofence. The graphical indicator used to display the information may be generated at the time of triggering, or may be pre-generated and then displayed when triggered. The geofence model is an example of a "push model" that may be utilized, as the user device is notified (e.g. "pushed" by the geofences) when the user device is detected as having crossed a geofence boundary, e.g. from GPS data.

In other examples, a "pull model" may be used, in which the user device continually checks the absolute distance between the user and a familiar location to determine when to display a graphical indicator, without the use of geofences. In such a "pull model," the user device may periodically check the user's distance from a familiar location, "pulling" the answer to determine whether or not to display a graphical indicator. For example, the user device may compare the determined distance from a familiar location to a predetermined threshold distance, and display the graphical indicator once the determined distance falls within the threshold distance.

In the example of FIG. 2, a user 214 has crossed geofence 212 associated with nearby familiar location 206. In response, a device carried by the user 214 (e.g. a head-mounted display device or smartphone) displays a graphical indicator 216 to the user 214 that contains directional information indicating a relative position of the familiar location 206. In the depicted example, the graphical indicator 216 takes the form of a virtual arrow that is pointing towards the familiar location 206 in relation to the user's current perspective. The graphical indicator 216 may be displayed in any suitable manner. For example, the graphical indicator 216 may be displayed in a world-locked manner (e.g. displayed as being at a fixed location relative to the world) at a predetermined location (e.g. at a fixed location with reference to an intersection of a street on which the user is located and a street on which the familiar location is located), or may be displayed to follow a user's gaze (e.g. by being displayed at an intersection of a user's gaze and the street on which the familiar location is located). In other examples, a graphical indicator may be displayed at any other suitable location, such as over a location at a sufficient height (e.g. above a building) and/or at a location determined to be viewable by a user (e.g. not occluded by other structures).

Graphical indicators of familiar locations also may be displayed when a user is virtually navigating an area using a mapping application or other navigational application. For example, as a user navigates a map using a first-person, street-level view or a virtual reality view within a mapping application, the device may be configured to track the virtual location of the user within the map and compare the virtual location to geofences for the user's familiar locations or to distance thresholds from familiar locations, and output graphical indicators and/or other directional information regarding familiar locations as the user's virtual location crosses the geofences for the familiar locations geofences.

In other examples, a graphical indicator may be displayed as being located between the user's location and the familiar location, such that the graphical indicator moves to remain between the user and the familiar location as the user moves down the street or path. The graphical indicator could be used to lead the user to the familiar location, if the user wanted, as the user moves around the area.

Figure 3:
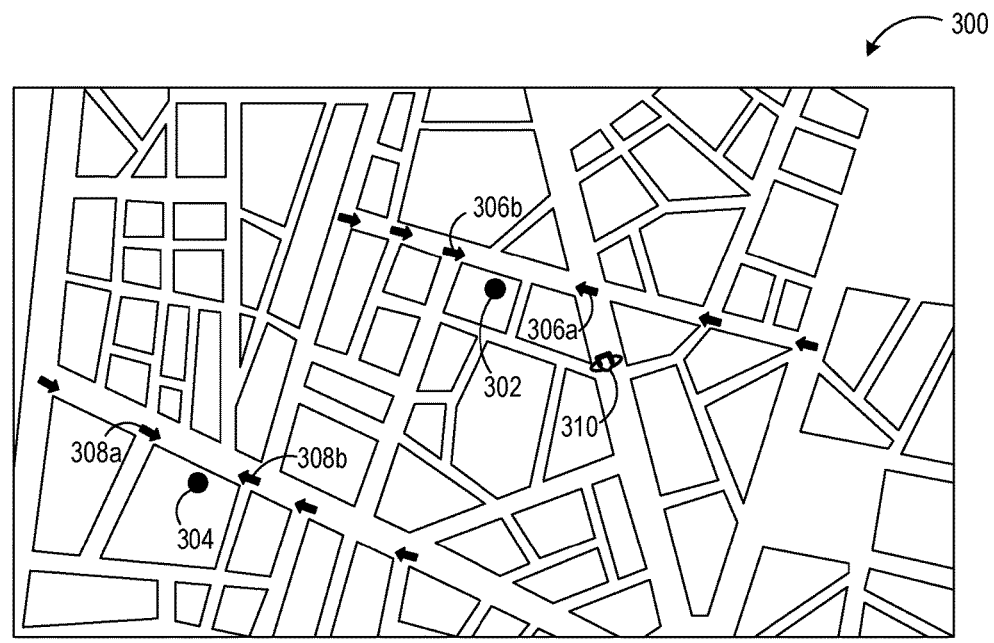
FIG. 3 shows an example map illustrating an overlay layer comprising graphical indicators for determined familiar locations.

As another example, instead of a user-centric model, a place-centric model may be utilized in which graphical indicators may be stored in a map layer and displayed persistently when a view of the indicators is unoccluded, rather than displayed upon crossing of a geofence. FIG. 3 shows an example map 300 representing a layer storing familiar locations 302 and 304 and graphical indicators 306, 308 pointing respectively to each familiar location appearing within a certain distance from the familiar location at predetermined locations. In such an example, the graphical indicators may be pre-positioned at intersections of a street on which the familiar location is located, pointing down the street in the direction of the familiar location. In the depicted example, graphical indicator 306a is located at a road intersection from which the familiar location 302 is accessible, pointing toward a direction of the familiar location 302. Graphical indicator 306b is located at a road intersection on an opposite side of the familiar location 302, and points in the opposite direction toward the familiar location 302. Similarly, graphical indicators 308a and 308b point towards familiar location 304 from opposite directions. As a user 310 navigates the area, the user 310 may serendipitously encounter the graphical indicators at the predetermined intersections when such a graphical indicator comes into view of the user 310. For example, graphical indicator 306a may be displayed when a gaze of the user 310 faces the graphical indicator 306a, as determined via data such as GPS data, gaze tracking data from a gaze tracking system, and/or image data of a scene from an outward facing camera of the user device.

In some examples, one or more noise control algorithms may be applied to control an amount of visual content displayed regarding possible familiar locations. Such an algorithm may control noise in any suitable manner. For example, a noise control algorithm may determine to selectively disable the display of directional information regarding familiar locations when it is determined that a user is already sufficiently familiar with an area. Likewise, in areas in which directional information is displayed, a number and/or density of graphical indicators displayed may vary. As one example, a number and/or density of graphical indicators may be adjusted based on a degree of familiarity of the user with the geographic area, such that indicators may be shown more frequently (e.g. appear at more intersections) when it is determined that a user is less familiar with the area, and may be shown less frequently (e.g. at fewer intersections) when it is determined that the user is more familiar with the area. As yet another example, the list of familiar locations may be prioritized, and signs only shown for higher priority locations. A user's degree of familiarity with the area may be determined based on factors such as a frequency of visits by the user, a density of determined familiar locations in the area, and/or any other suitable metrics.

A determined degree of familiarity with the area may also be used to adjust geofences used in a user-centric model. For example, as mentioned above, a size (e.g. radius) of a geofence surrounding a familiar location may be adjusted based upon a degree of a user's familiarity with the location. As a more specific example, where it is determined that the user may be relatively more familiar with an area, the radii of geofences within that area may be smaller than where it is determined the user may be relatively less familiar with the area.

Densities of graphical indicators and/or sizes of geofences further may be varied based upon other factors. For example, such parameters may vary based upon a time of day. As a more specific example, a user may have only been to a certain geographic area in the daytime, and not at nighttime. Thus, if the user returns to the geographic area during the night, a higher density of graphical indicators pointing to familiar locations may be shown than if the user had returned during the day, since the surroundings may appear less familiar to the user at night. In other examples, the display of graphical indicators may be adjusted based upon characteristics of the geographic area, such as how large the area is (e.g. town or city), a determined safety of the geographic area (e.g. as determined from a safety index or crime index for the area), and/or based on user inputs requesting for more or fewer graphical indicators to be displayed.

As mentioned above, in some examples, a list of determined familiar locations may be prioritized. In such an example, if a user is determined to be near multiple familiar locations, instead of displaying indicators for all of the locations, a device may display locational indicators for one or more higher priority familiar locations, and not for one or more lower priority familiar locations. The device may prioritize familiar locations based upon any suitable factors, such as a frequency of visits and/or a recency of a visit to each familiar location, as examples.

In yet other examples, rather than using geofences or an invisible map layer of indicators, other suitable methods may trigger the display of a directional indicator. For example, a device may detect a pattern of movement from GPS data indicating that a user is currently having trouble finding a way around the area, and may display an indicator pointing to a familiar location in response. As a more specific example, the device may detect that a path of the user indicates a possibility of being lost, such as the user repeatedly veering from a navigation path during a guided navigation on a mapping application, the user traversing a same path repeatedly, the user frequently changing directions, the user frequently performing a search for a location, etc.

Locations also may be removed from a list of familiar locations. For example, a device may remove a selected location from the list of familiar locations based upon an insufficient recency of a most recent visit to the selected location, an insufficient frequency of visits to the selected location, and/or a user input requesting removal of the selected location.

Figure 4:
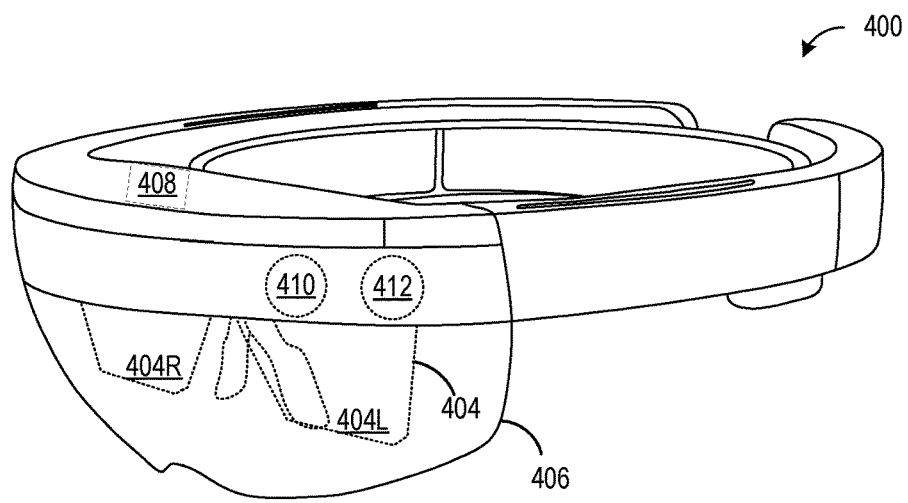
FIG. 4 shows an example augmented reality display device in the form of a head-mounted display device.
Figure 5:
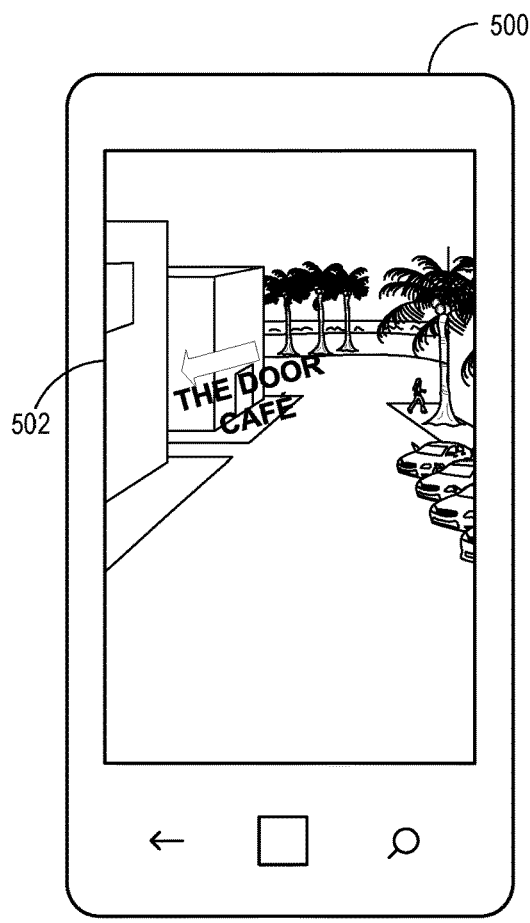
FIG. 5 shows an example augmented reality display device in the form of a smartphone.

FIGS. 4 and 5 show example devices that may be configured to provide familiarizing directional information to a user. FIG. 4 shows an example augmented reality display device in the form of a head-mounted display device 400. As mentioned above, the head-mounted display device 400 may utilize augmented reality technologies to enable simultaneous viewing of virtual display imagery and a real-world background. As such, the display device 400 may generate virtual images via see-through display 404, which includes separate right and left eye displays 404R and 404L, and which may be wholly or partially transparent. The see-through display 404 may take any suitable form, such as one or more waveguides or prisms configured to receive a generated image and direct the image towards a wearer's eye. The see-through display 404 may include a backlight and a microdisplay, such as liquid-crystal display (LCD) or liquid crystal on silicon (LCOS) display, in combination with one or more light-emitting diodes (LEDs), laser diodes, and/or other light sources. In other examples, the see-through display 404 may utilize quantum-dot display technologies, active-matrix organic LED (OLED) technology, and/or any other suitable display technologies. It will be understood that while shown in FIG. 4 as a flat display surface with left and right eye displays, the see-through display 404 may be a single display, may be curved, or may take any other suitable form. Further, in other examples, augmented reality display may be accomplished via compositing virtual imagery with video images acquired by a camera on the device and displayed to the user.

The head-mounted display device 400 further includes an additional see-through optical component 406, shown in FIG. 4 in the form of a see-through veil positioned between the see-through display 104 and the background environment as viewed by a wearer. A controller 408 is operatively coupled to the see-through optical component 404 and to other display componentry. The controller 408 includes one or more logic devices and one or more computer memory devices storing instructions executable by the logic device(s) to enact functionalities of the display device, such as to display graphical indicators as described herein. The display device 400 may further include various other components, for example a two-dimensional image camera 410 (e.g. a visible light camera and/or infrared camera) and a depth camera 412, as well as other components that are not shown, including but not limited to speakers, microphones, accelerometers, gyroscopes, magnetometers, temperature sensors, touch sensors, biometric sensors, other image sensors, eye-gaze detection systems, energy-storage components (e.g. battery), a communication facility, a GPS receiver, etc.

Although FIGS. 1-4 are described above in the context of an augmented reality head-mounted display device, it will be understood that any other suitable devices may be configured to display or otherwise output directional information indicating the relative position(s) of nearby familiar location(s). FIG. 5 shows an example smartphone 500 that may be configured to display graphical indicators on a display screen 502 in a video augmented reality implementation. In other examples, rather than an augmented reality configuration, a display device may display a virtual representation of a geographic area, such as presenting a street viewing experience, and display graphical indicators as the user virtually navigates around the geographic area within the virtual environment. As such, laptops, desktop computers, and other suitable computing display devices may be configured to display graphical indicators in such a virtual representation. In further examples, rather than or in addition to displaying graphical indicators, a device may output textual and/or audio notifications.

Figure 6A:
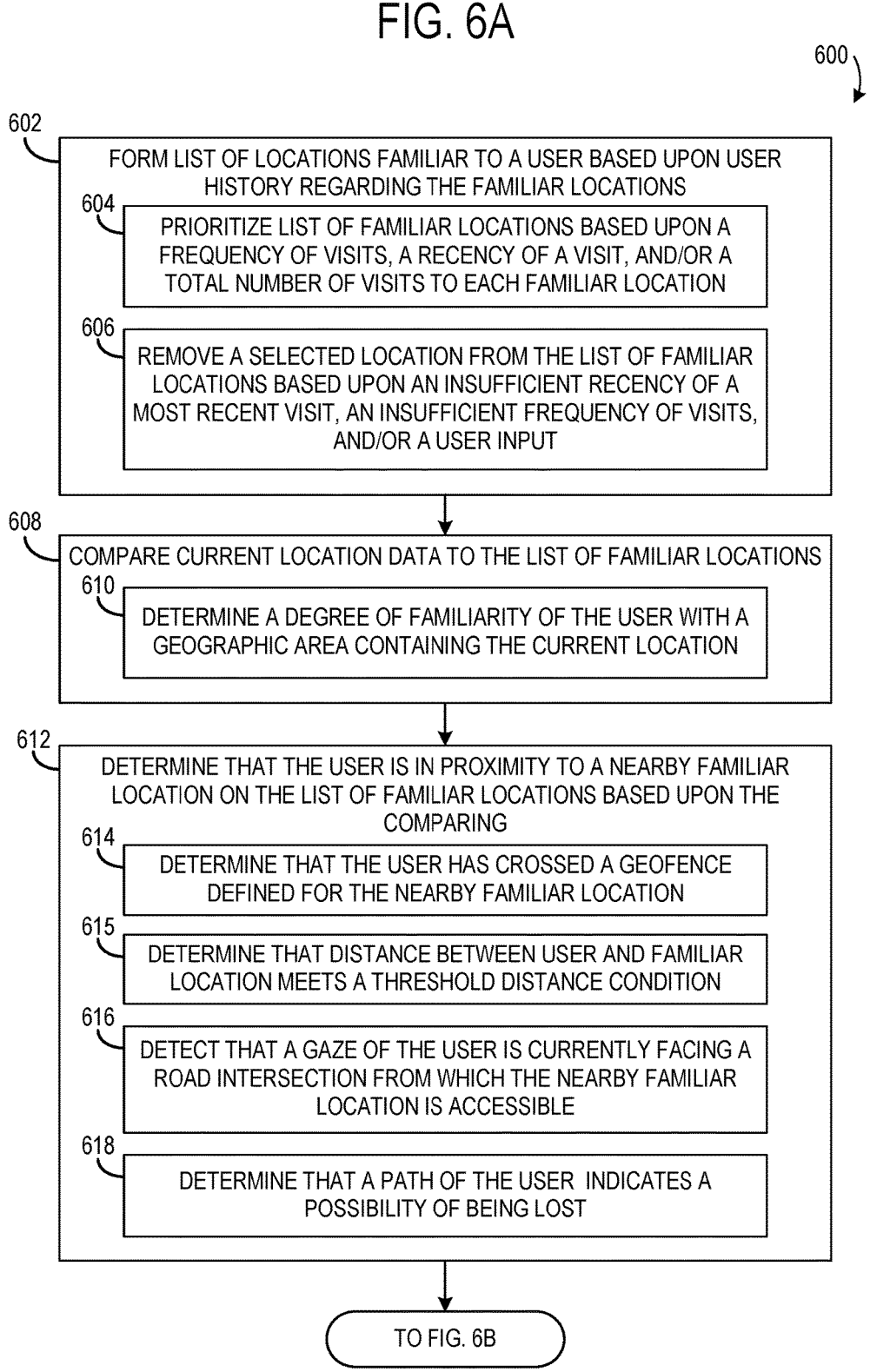

FIG. 6 shows an example method 600 of providing directional information relating to nearby familiar locations on a display device. Method 600 includes, at 602, forming a list of familiar locations for a user based upon user history regarding the familiar locations. As described above, user history may include one or more of search history, GPS history, user input, calendar data, email data, application data, texting data, and any other suitable data. Logic configured to assemble the list of familiar locations from user history may reside local to the display device, or at a remote location accessible via a network. Method 600 further may include, at 604, prioritizing the list of familiar locations based upon a frequency of visits, a recency of a visit, and/or a total number of visits to each familiar location. Any other suitable factors may be utilized to help prioritize the list, including user input. Method 600 further may include, at 606, removing a selected location from the list of familiar locations. For example, this determination may be based upon an insufficient recency of a most recent visit, an insufficient frequency of visits, a user input, or any other suitable inputs that may indicate the selected location should not be included as a familiar location.

Method 600 further includes, at 608, comparing current location data to the list of familiar locations. This may further include, at 610, determining a degree of familiarity of the user with a geographic area containing the current location. For example, as mentioned above, a degree of familiarity may be indicated by a frequency visits to the area and/or a recency of a visit to the area. Method 600 also includes, at 612, determining that the user is in proximity to a nearby familiar location on the list of familiar locations. This may be performed by determining that the user has crossed a geofence at 614, or by periodically determining whether a distance between the user and the nearby familiar location meets a threshold distance condition, at 615. Method 600 further may include, at 616, detecting that a gaze of the user is currently facing a road intersection from which the nearby familiar location is accessible, at 618 determining that a path of the user indicates a possibility of being lost, and/or upon any other suitable factors. Such comparisons may be performed locally, or via a remote service by periodically sending a current location of the display device to the remote server for comparison to mapping data.

Continuing with FIG. 6B, method 600 includes at 620 outputting directional information indicating a relative position of the nearby familiar location on the list of familiar locations. The directional information may be output as one or more graphical indicators comprising a directional symbol and text information regarding the nearby familiar location, at 622, or may take any other suitable form. Such a graphical indicator may be displayed at an intersection of a street on which a user is located or a gaze line of a user with a street on which the familiar location is located, above the familiar location, or in any other suitable location. In these examples, the directional information is displayed in an augmented reality image, at 624, but may be presented in other manners, such as in audio form. In some examples, a plurality of nearby familiar locations may be identified, and one or more indicator(s) may be selected for display based upon a degree of familiarity of the user with the geographic area, each indicator indicating a relative location of a corresponding familiar location, as shown at 626. In other examples, one or more indicator(s) may be selected for display based upon a priority of each nearby familiar location, as shown at 628. The directional information may then be displayed based upon the degree familiarity of the user with the geographic area and/or a priority of each nearby familiar location, as indicated at 630. Further, indicator(s) may be selectively disabled when it is determined that a user is already sufficiently familiar with an area 632.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
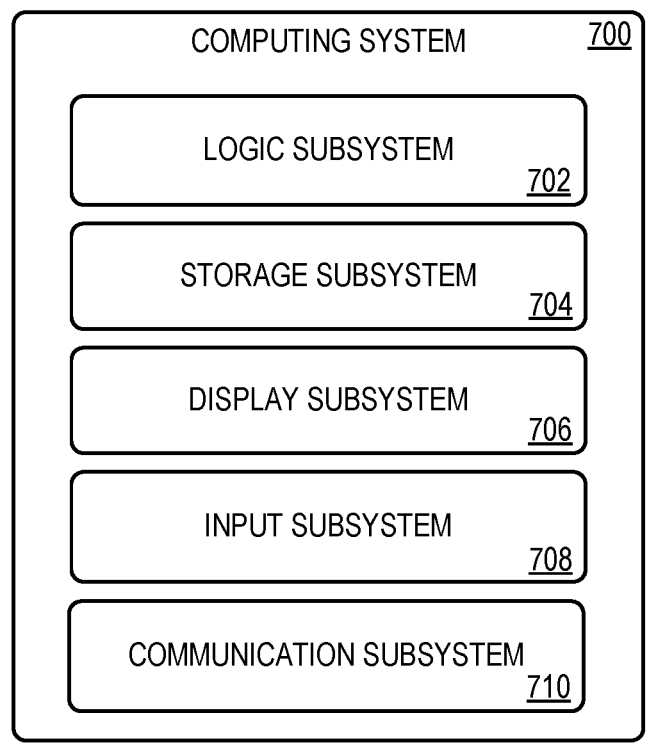
FIG. 7 is a block diagram of an example computing device.

FIG. 7 schematically shows a non-limiting example of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. The head-mounted display device 102, head-mounted display device 400, and smartphone 500 are example implementations of computing system 700.

Computing system 700 includes a logic machine 702 and a storage machine 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic subsystem 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 702 may include one or more processors configured to execute software instructions. Additionally or alternatively, the logic machine may include one or more hardware or firmware logic machines configured to execute hardware or firmware instructions. Processors of the logic subsystem 702 may be single-core or multi-core, and the instructions executed thereon may be configured for sequential, parallel, and/or distributed processing. Individual components of the logic subsystem 702 optionally may be distributed among two or more separate devices, which may be remotely located and/or configured for coordinated processing. Aspects of the logic subsystem 702 may be virtualized and executed by remotely accessible, networked computing devices configured in a cloud-computing configuration.

Storage subsystem 704 includes one or more physical devices configured to hold instructions executable by the logic subsystem 702 to implement the methods and processes described herein. When such methods and processes are implemented, the state of storage subsystem 704 may be transformed—e.g., to hold different data.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage subsystem 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a computing device comprising a display, a logic subsystem, and a storage subsystem comprising instructions executable by the logic subsystem to form a list of familiar locations for a user based upon user history regarding the familiar locations, determine that the user is within a threshold proximity to a nearby familiar location on the list of familiar locations, and in response, output directional information indicating a relative position of the nearby familiar location on the list of familiar locations. The computing device may additionally or alternatively include an augmented reality display device and the display may additionally or alternatively include a see-through display, and wherein the instructions are executable to output the directional information as a graphical indicator in an augmented reality image. The computing device may additionally or alternatively include one or more of a head-mounted display device and a smartphone. The directional information may additionally or alternatively be output as a graphical indicator comprising a directional symbol and text information regarding the nearby familiar location. The graphical indicator may additionally or alternatively be stored in an overlay map layer comprising a plurality of graphical indicators, each graphical indicator corresponding to a familiar location in the list of familiar locations. The instructions may additionally or alternatively be executable to determine that the user is in proximity to the nearby familiar location by determining if the user has crossed a geofence defined for the nearby familiar location. The instructions may additionally or alternatively be executable to determine that the user is in proximity to the nearby familiar location by comparing the current location data to the nearby familiar location and determining if the user is within a threshold distance from the nearby familiar location. The instructions may additionally or alternatively be executable to output the directional information indicating a relative position of the nearby familiar location upon determining that a path of the user indicates a possibility of being lost. The instructions may additionally or alternatively be executable to output the directional information upon detecting that a gaze of the user is currently facing a road intersection from which the nearby familiar location is accessible. The instructions may additionally or alternatively be executable to determine a degree of familiarity of the user with a geographic area containing the current location, and display the directional information further based upon the degree of familiarity. The instructions may additionally or alternatively be executable to identify a plurality of nearby familiar locations, and to select one or more indicators to display based upon one or more of the degree of familiarity regarding the user with the geographic area and a priority of each nearby familiar location on the list. The instructions may additionally or alternatively be executable to prioritize the list of familiar locations based upon one or more of a frequency of visits, a recency of a visit, and a total number of visits to each familiar location on the list of familiar locations. The user history may additionally or alternatively include one or more of search history, GPS history, user input, calendar data, email data, application data, and texting data. The instructions may additionally or alternatively be executable to remove a selected location from the list of familiar locations based upon one or more of an insufficient recency of a most recent visit to the selected location, an insufficient frequency of visits to the selected location, an insufficient total number of visits to the selected location, and a user input.

On a computing device comprising a display, a method comprising forming a list of familiar locations for a user based upon user history regarding the familiar locations, determining that the user is in proximity to a nearby familiar location on the list of familiar locations, and outputting directional information indicating a relative position of the nearby familiar location on the list of familiar locations. The directional information may additionally or alternatively be output as a graphical indicator comprising a directional symbol and text information regarding the nearby familiar location. Determining that the user is in proximity to the nearby familiar location may additionally or alternatively include one or more of determining that the user has crossed a geofence defined for the nearby familiar location and determining that the user is within a threshold distance of the nearby familiar location.

Another example provides a head-mounted display device, comprising, a display, a logic subsystem, and a storage subsystem comprising instructions executable by the logic subsystem to form a list of familiar locations for a user based upon user history regarding the locations, compare current location data to the list of familiar locations, determine that the user is in proximity to a nearby familiar location on the list of familiar locations based upon comparing the current location data to the list of familiar locations, and display a graphical indicator comprising directional information indicating a relative position of the nearby familiar location on the list of familiar locations. The graphical indicator may additionally or alternatively include a directional symbol and text information regarding the nearby familiar location. The instructions may additionally or alternatively be executable to determine that the user is in proximity to the nearby familiar location by determining that the user has crossed a geofence defined for the nearby familiar location.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a display;
a logic subsystem; and
a storage subsystem comprising instructions executable by the logic subsystem to
form a list of familiar locations for a user based upon user history regarding the familiar locations,
determine a degree of familiarity of the user with a geographic area containing a current location of the user,
determine that the user is within a threshold proximity to a nearby familiar location on the list of familiar locations, the nearby familiar location being out of view, and
in response, output directional information indicating a position of the nearby familiar location on the list of familiar locations relative to a current location of the user, the directional information being based upon the degree of familiarity.

2. The computing device of claim 1, wherein the computing device comprises an augmented reality display device and the display comprises a see-through display, and wherein the instructions are executable to output the directional information as a graphical indicator in an augmented reality image.

3. The computing device of claim 2, wherein the computing device comprises one or more of a head-mounted display device and a smartphone.

4. The computing device of claim 1, wherein the directional information is output as a graphical indicator comprising a directional symbol and text information regarding the nearby familiar location.

5. The computing device of claim 4, wherein the graphical indicator is stored in an overlay map layer comprising a plurality of graphical indicators, each graphical indicator corresponding to a familiar location in the list of familiar locations.

6. The computing device of claim 1, wherein the instructions are executable to determine that the user is in proximity to the nearby familiar location by determining if the user has crossed a geofence defined for the nearby familiar location.

7. The computing device of claim 1, wherein the instructions are executable to determine that the user is in proximity to the nearby familiar location by comparing the current location data to the nearby familiar location and determining if the user is within a threshold distance from the nearby familiar location.

8. The computing device of claim 1, wherein the instructions are executable to output the directional information indicating a relative position of the nearby familiar location upon determining that a path of the user indicates a possibility of being lost.

9. The computing device of claim 1, wherein the instructions are executable to output the directional information upon detecting that a gaze of the user is currently facing a road intersection from which the nearby familiar location is accessible.

10. The computing device of claim 1, wherein the instructions are executable to identify a plurality of nearby familiar locations, and to select one or more indicators to display based upon one or more of the degree of familiarity regarding the user with the geographic area and a priority of each nearby familiar location on the list.

11. The computing device of claim 10, wherein the instructions are executable to prioritize the list of familiar locations based upon one or more of a frequency of visits, a recency of a visit, and a total number of visits to each familiar location on the list of familiar locations.

12. The computing device of claim 1, wherein the user history comprises one or more of search history, GPS history, user input, calendar data, email data, application data, and texting data.

13. The computing device of claim 1, wherein the instructions are further executable to remove a selected location from the list of familiar locations based upon one or more of an insufficient recency of a most recent visit to the selected location, an insufficient frequency of visits to the selected location, an insufficient total number of visits to the selected location, and a user input.

14. On a computing device comprising a display, a method comprising:
   forming a list of familiar locations for a user based upon user history regarding the familiar locations;
   determining a degree of familiarity of the user with a geographic area containing a current location of the user;
   determining that the user is in proximity to a nearby familiar location on the list of familiar locations, the nearby familiar location being out of view; and
   outputting directional information indicating a position of the nearby familiar location on the list of familiar locations relative to a current location of the user, the directional information being based upon the degree of familiarity.

15. The method of claim 14, wherein the directional information is output as a graphical indicator comprising a directional symbol and text information regarding the nearby familiar location.

16. The method of claim 14, wherein determining that the user is in proximity to the nearby familiar location comprises one or more of determining that the user has crossed a geofence defined for the nearby familiar location and determining that the user is within a threshold distance of the nearby familiar location.

17. A head-mounted display device, comprising:
   a display;
   a logic subsystem; and
   a storage subsystem comprising instructions executable by the logic subsystem to
      form a list of familiar locations for a user based upon user history regarding the locations,
      determine a degree of familiarity of the user with a geographic area containing a current location of the user
      compare current location data to the list of familiar locations,
      determine that the user is in proximity to a nearby familiar location on the list of familiar locations based upon comparing the current location data to the list of familiar locations, the nearby familiar location being out of view, and
      display directional information comprising a graphical indicator comprising directional information indicating a position of the nearby familiar location on the list of familiar locations relative to a current location of the user, the directional information being based on the degree of familiarity.

18. The head-mounted display device of claim 17, wherein the graphical indicator comprises a directional symbol and text information regarding the nearby familiar location.

19. The head-mounted display device of claim 17, wherein the instructions are executable to determine that the user is in proximity to the nearby familiar location by determining that the user has crossed a geofence defined for the nearby familiar location.

* * * * *